United States Patent [19]
LaForce

[11] 3,852,906
[45] Dec. 10, 1974

[54] FISHING SINKER HAVING BUOYANCY

[76] Inventor: Robert C. LaForce, 514 West View Dr., Beaver, Pa. 15009

[22] Filed: Feb. 9, 1973

[21] Appl. No.: 331,064

[52] U.S. Cl. ............... 43/43.14, 43/43.13, 43/44.97
[51] Int. Cl. ............................................ A01k 95/00
[58] Field of Search ............... 43/43.14, 43.1, 42.22, 43/43.13, 44.87

[56] References Cited
UNITED STATES PATENTS

| | | |
|---|---|---|
| 1,878,015 | 9/1932 | Steffensen ..................... 43/43.14 X |
| 2,587,311 | 2/1952 | Golnick ......................... 43/44.87 X |
| 2,863,253 | 12/1958 | Hettinger .......................... 43/43.14 |
| 3,092,925 | 6/1963 | Ho et al. .......................... 43/43.14 |
| 3,359,674 | 12/1967 | Strumor ........................ 43/43.14 X |
| 3,670,447 | 6/1972 | Wohead ........................... 43/43.14 |

Primary Examiner—James H. Czerwonky
Attorney, Agent, or Firm—Parmalee, Miller, Welsh & Kratz

[57] ABSTRACT

An improved fishing sinker having an elongated cylindrical-shaped body of hollow construction is closed-off at its ends to define an air space therein, and carries weight or ballast means at its lower end. A ringlike connector is mounted on the body for up and down movement therealong, and latching finger means is provided for retaining the ring in one of a selected group of positions to provide different points of connection of a fishing line thereto. Ballast means of different characteristics or weight may be used interchangeably with the body.

11 Claims, 14 Drawing Figures

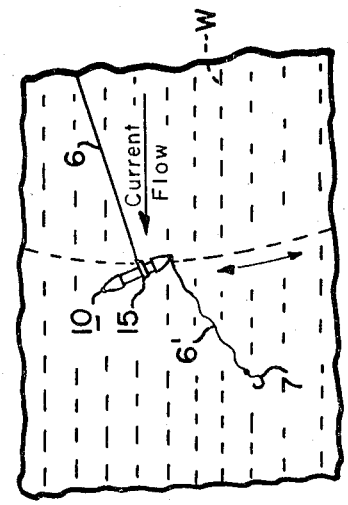
Fig. 5
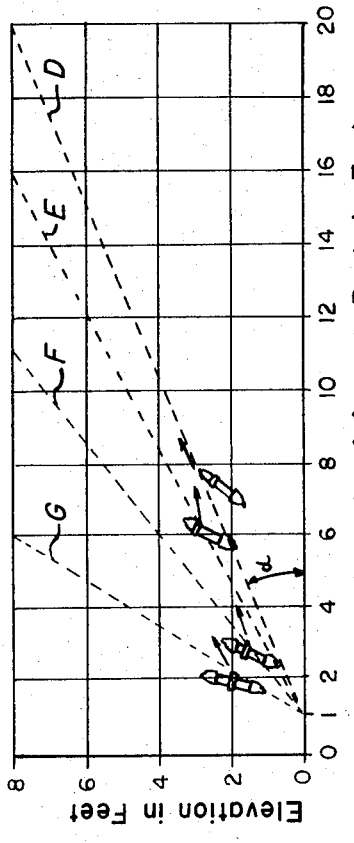
Fig. 4
| Line | Angle α | Eyelet |
|------|---------|--------|
| D    | 23°     | A      |
| E    | 28°     | B-1    |
| F    | 38°     | B-2    |
| G    | 58°     | B-3    |
Fig. 4A
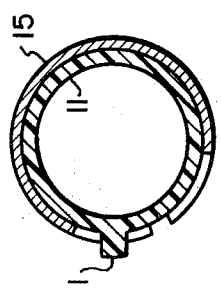
Fig. 2
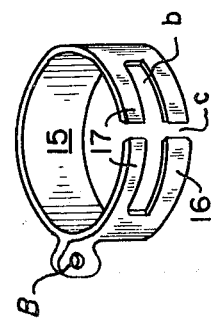
Fig. 3
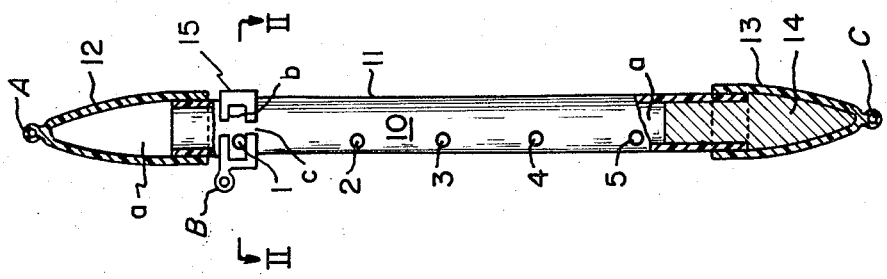
Fig. 1

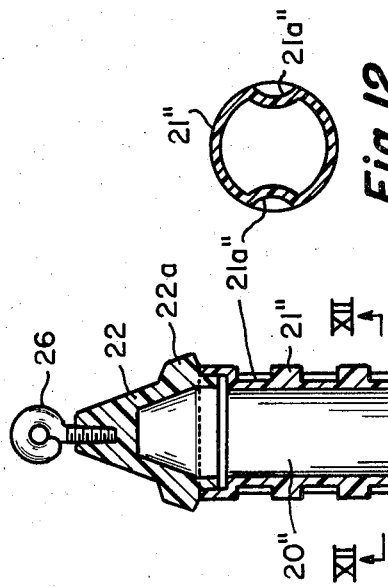
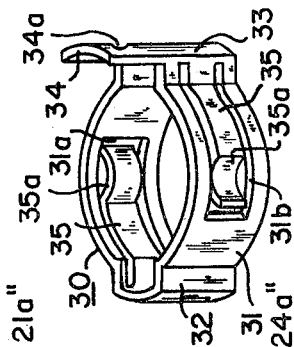
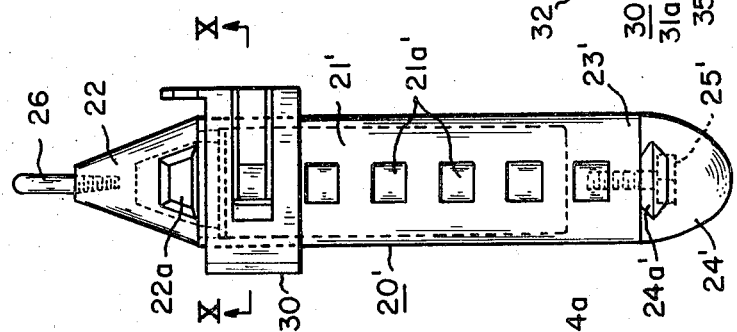
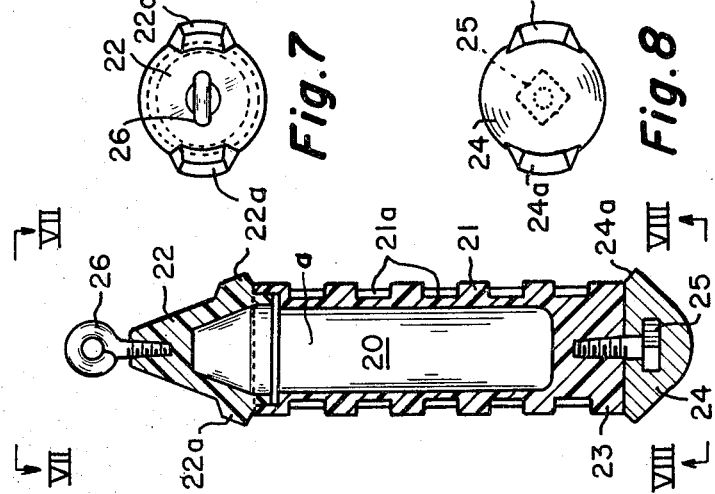

FISHING SINKER HAVING BUOYANCY

BACKGROUND OF THE INVENTION

1. Field of the Invention

This invention relates to a fishing line sinker that has characteristics of buoyancy in water and whose operating characteristics may be adjusted for different fishing conditions and particularly, for adaptation to the fishing environment, e.g. to compensate for the flow and other characteristics of the body of water, the depth location of the fish, etc.

2. Description of the Prior Art

Solid lead or lead metal alloy sinkers of different sizes have heretofore been used for attaching to a fishing line to cause the lure to sink to a requisite depth within a body of water and cooperate with a float or bobbin to give the lure a proper position within the water for catching a particular species of fish. In my copending application Ser. No. 308,413 of Nov. 21, 1972, entitled Semi-Buoyant Sinker, I have disclosed a sinker which has many advantages in the art. The present disclosure deals with improved sinkers of this general type which will enable the fisherman to utilize a hollow sinker body for various types of fishing requirements, both from the standpoint of its casting as well as its operating characteristics within a body of water.

SUMMARY OF THE INVENTION

It has thus been an object of the present invention to devise improved sinkers of a semi-buoyant type that will have an increased efficiency in use.

Another object of the invention has been to develop a sinker that is flexible in its adaptation to different requirements of a fisherman.

A further object of the invention has been to develop an improved sinker from the standpoint of its operating characteristics and one which has a substantially fixed shape or size of buoyancy producing air space therein.

A further object of the invention has been to develop a somewhat pencil-shaped sinker having an improved ratio of length to diameter, and having connector means that is adjustable along its length to vary the point of connection of a fishing line thereto.

These and other objects of the invention will appear to those skilled in the art from the illustrated embodiments and the claims.

BRIEF DESCRIPTION OF THE DRAWINGS

In the drawings, FIG. 1 is a vertical view, sectioned at its upper and lower ends, illustrating a form of pencil-like casting sinker embodying the invention.

FIG. 2 is an enlarged horizontal section taken along the line II—II of FIG. 1.

FIG. 3 is a schematic view in elevation on the scale of FIG. 2 illustrating details of the construction of a slidable connector ring part of the sinker device of FIG. 1.

FIG. 4 is a chart illustrating comparative lengths of ascent paths within a body of water, as involved using different connected positions of a fishing line with respect to a sinker, such as illustrated in the drawings.

FIG. 4A is a chart relating to FIG. 4 showing representative line connected positions, the related distance of travel and angular relationships of the sinker with respect thereto, as accomplished by employing each of four different reference positions of line connection to a sinker device as applied to the device of FIG. 1.

FIG. 5 is a fragmental diagrammatic view showing the influence of current flow of a body of water on a sinker of the invention that has a lure or hook line connected to its bottom end and a rod line connected to its adjustable connector means.

FIG. 6 is a vertical section on an intermediate scale with respect to FIGS. 2 and 3, illustrating a preferred form of a sinker constructed in accordance with the invention.

FIGS. 7 and 8 are horizontal top and bottom sections on the scale of and taken respectively along the lines VII—VII and VIII—VIII of FIG. 6.

FIG. 9 is a vertical view in elevation on the scale of FIG. 6, generally illustrating the outside construction of the embodiment of FIG. 6, but further illustrating the use of a larger ballast or weight element and a body of greater length. Also, a ring-like slidable connector means which is adapted for use with the constructions of FIGS. 6, 9 and 11, is shown in an uppermost latched position.

FIG. 10 is a horizontal cross section on the scale of and taken along the line X—X of FIG. 9.

FIG. 11 is a vertical section on the scale of FIGS. 6 and 9, showing a sinker of the general construction of FIGS. 6 and 9 but of greater length and as having a heavier, larger ballast or weight attached thereto.

FIG. 12 is a horizontal section on the scale of and taken along the line XII—XII of FIG. 11.

And, FIG. 13 is an enlarged isometric view in elevation showing details of the construction of the ring-like slidable connector means that is also shown in FIGS. 9 and 10.

DESCRIPTION OF THE PREFERRED EMBODIMENT

Referring particularly to FIGS. 1 to 3, inclusive, a sinker 10 having an elongated pencil-like cylindrical body 11 is shown provided with a hollow, air space providing interior that is open at its opposite ends. A body of the construction of the present invention essentially has an appreciably greater length than width or diameter, or a minimum ratio of about 4 to 1. The body 11 may be constructed of resin or metal material using tubing and defines an enclosed, sealed-off air space or chamber $a$ with an upper, somewhat cone-shaped, hollow, upwardly converging closure cap 12 and a lower, somewhat cone-shaped cap, plug or closure means 13. The lower end cap 13 is shown of filled construction to provide ballast or weight means 14 for the sinker 10. As shown in FIG. 1, the cap 12 may be provided with a fishing pole line receiving eyelet A at its upper closed end and has a slide-over fit with the upper end of the body 11. It may be secured in a sealed relation thereon by heat or cement if resin materials are involved or by a welding or brazing operation, if metal parts are involved. The lower edges of the mouth of the upper cap 12 serve as upper limit abutment for vertical or longitudinal travel of a slidably-adjustable, ring-like connector means 15 that has a connector eyelet B for receiving a fishing pole line.

The lower end cap 13 carries a solid core weight or ballast 14 of a suitable material, such as lead or soft iron, which fills it and which adjacent its upper end, extends in the form of a smaller diameter plug portion into the open lower end of the body 11.

As shown in FIG. 1, the solid ballast portion 14 and cooperating upper edge portions of the lower cap 13 serve to receive the lower, open-end portion of the body 11 therein. The adjacent portions of the body and the cap 13 may be secured by cementing, brazing, soldering or welding, depending on the type of material involved. The lower cap 13 has also been shown provided with an eyelet C which may, as shown in FIG. 5, be connected to a lure or bait line 6' to extend therefrom. It will be noted that pole line 6 is connected to the slide connector ring 15 or to the eyelet A, depending on desired operating characteristics of the sinker 10. That is, the eyelet A of the cap 12 and the eyelet B of the adjustable connector slide 15 serve as alternate connections for the rod line 6.

To provide additional points of connection for the fishing line, the connector ring 15 is adapted to be moved vertically or longitudinally along the outside of the body 11 in a slidable relation. In this connection, a circumferential, closed end, cross-extending latching slot portion $b$ formed in the ring 15 and is open to a vertical, through-extending, open-end, centrally-disposed, bypass slot portion $c$. The ring 15 has upper and lower finger pairs or bifurcations 16 and 17 that cooperate with the slot portions to provide latching fingers. A vertically or longitudinally spaced-apart group of latching lugs or projections 1, 2, 3, 4 and 5 provide alternative latching positions for the ring 15. When the ring 15 is moved along the body 11 until one of the projecting lugs 1, 2, 3, 4 or 5 enters the slot $c$, then a twist or turn of the ring 15 clockwise or counterclockwise will cause the adjacent lug, such as 1, to move into one end of the latching slot portion $b$ and thus latch or lock the ring 15 in position. A counterturn until the lug 1 is aligned with the slot $c$ enables the ring 15 to then be moved to a new position in alignment with, for example, a second lug such as 2.

FIGS. 4 and 4A illustrate the result of employing different connecting positions of the pole line 6 with respect to the sinker 10. Dotted line D illustrates the path of upward movement of the sinker upon pole line pull when the pole line 6 is connected to the eyelet A. Line E illustrates the path when the pole line is connected to the eyelet B with the slide ring 15 in its uppermost position of FIG. 1, represented as B-1. F represents the path when the pole line is connected through the agency of the connector means 15 at the lug 2 (indicated as B-2), and G indicates the path when the connector 15 is latched with the lug 3 (indicated as B-3). It is apparent from these charts that the distance or lengths of ascent of the sinker and thus, of any lure attached thereto can be varied as desired through the agency of different positions of connection of the pole line 6 to the sinker, when the sinker is being pulled out of a body of water by a fisherman using a fishing pole or rod. In FIG. 5, the dotted line illustrates the path of movement of a sinker under conditions of current flow when the pole line is being held taut.

FIGS. 6, 9 and 11 show sinker devices 20, 20' and 20'' of the same general construction, but embodying different lengths of bodies, a different number of latching recess portions, and different sizes of ballast or weight attachment means. Referring particularly to FIGS. 6, 7 and 8, the sinker 20 has a cylindrical, somewhat pencil-shaped, elongated body 21 that is open at its upper end and that has a closed bottom end wall 23. Opposite parts of vertically spaced-apart depressions or recess portions 21a are provided along the body to serve as latching portions for a variable position slide connector ring 30. A cone-shaped, hollow, upper end cap 22 is shown provided with a mouth flange or rim that fits within the upper open end of the body 21 and that is adapted to seal-off its air space. The cap 22 has a pair of opposed retainer lugs 22a to prevent accidental loss of the connector ring 30 after the cap has been inserted in its interfitting relation within the body 21.

In FIG. 6, the body 21 and the cap 22 are shown as of resin or plastic material and thus, may be cemented or heat-sealed together to provide a fluid-type joint for longitudinal float spacing therein. A lead or soft iron weight or ballast part 24 has an inset threaded stem or bolt 25 projecting centrally upwardly therefrom to enable it to be removably mounted on the bottom end portion 23 of the body 21 alternatively as one of a group of different size ballast parts (see 24' and 24'' of FIGS. 9 and 11). As shown, the lower end wall 23 has a central, threaded bore to receive the threaded stem or bolt 25. To facilitate removal and insertion of the weight or ballast part 24 and to retain connector ring 30 on the body 21, it has been provided with a pair of lugs 24a, as shown particularly in FIG. 8. It will be appreciated that various sizes and shapes of weight parts 24 may be used as desired by the fisherman.

FIG. 9 illustrates a unit 20' that is of substantially the same construction as that of the unit 20 of FIG. 6, thus prime affixes have been used to designate slightly modified, somewhat similar parts. This figure illustrates a slightly larger and more elongated weight part 24' which can, of course, be used interchangably with the weight part 24 of FIG. 6, as well as the weight part 24'' of FIG. 11. Unit 20' is shown provided with an extra pair of latching recess portions 21a', thus enabling a further adjustment of the fishing line connection thereto. The embodiment of FIG. 11 has seven pairs of latching recess portions 21a'' and is shown provided with larger weight or ballast part 24''.

The units of FIGS. 6, 9 and 11 all utilize the same type and construction of adjustable connector means or ring part 30 which is adapted to be slid along the longitudinal or vertical extent of the body 21, 21' or 21'' to latch within a selected pair of latching recess portions 21a, 21a' or 21a''. Each pair consists of two diametrically opposed latching portions. Ring-like slidable connector 30 as shown particularly in FIGS. 10 and 13, has a circular or ring-like continuous body 31 provided with a pair of opposed, outwardly-offset, lug-like wall portions 32 and 33. These portions serve as hand grip portions, and the portion 33 also serves to carry a projecting eyelet tab 34 whose eyelet 34a is adapted to receive a fishing line. The slidable ring part 30 may be mounted with its tab 34 extending upwardly as shown in FIG. 9 or alternately extending downwardly; it is constructed in order that it will operate in either way.

The slidable ring 30 has a pair of opposed, curved spring latching fingers 35 that may be formed by cutting-out its wall 31 circumferentially to provide elongated closed-end slots 31a and 31b therein. One end of each latching finger 35 is integral with the wall 31 and its other end is given a rounded, segmental contour to provide an inwardly convex, latching thumb portion 35a. Each thumb portion 35a is convex inwardly of the wall 31 to make a complementary fit with an aligned, cooperating recess portion, such as 21a" of FIG. 12. In view of the construction of the pair of thumb portions 35a, they will be maintained in a latching position within an aligned pair of recess portions under spring tension, but may be moved out of latching retention by manual rotative force exerted to turn the ring 30 to the right or left (clock or counterclockwise). When the pair of latching thumbs 35a are moved out of a cooperating pair of latching recesses, then the slidable ring connector 30 may be slid along the body 21, 21' or 21" or outer wall of the unit to provide a selective adjustment that may be desired by the fisherman.

I claim:

1. In an improved fishing line sinker that is buoyant in water, an elongated cylindrical body having closure means on each end thereof to provide a closed-off air space therein, said body having a longitudinally spaced-apart group of latching means therealong, a slide ring operatively mounted on said body and having connector means for a fishing line, said latching means comprising longitudinally spaced-apart pairs of transversely aligned opposed offset portions on said body, and said slide ring also having latching finger means for position-retention engagement with a selected pair of said offset portions.

2. In an improved sinker as defined in claim 1, said latching finger means comprising a pair of spring-snap fingers adapted to be moved into and out of latching engagement with the selected pair of said offset portions by rotative movement of said ring with respect to said body.

3. In a sinker as defined in claim 1, said offset portions being recessed portions in said body, and said latching finger means comprising a pair of spring-snap fingers adapted to seat within the selected pair of said recess portions.

4. In an improved sinker as defined in claim 3, each spring-snap finger extending circumferentially along said ring and having an inwardly convex thumb at a forward end thereof to engage within an associated one of said recess portions.

5. In an improved sinker as defined in claim 4, thumbs of said pair of fingers being in an opposed relation with respect to each other, and each said thumb being integrally connected by a back end of its said finger to said ring.

6. In an improved sinker as defined in claim 2, said ring having a pair of opposite, outwardly offset wall portions, and each of said fingers extending along and within upper and lower reaches of said ring from an associated one of said offset wall portions.

7. In an improved sinker as defined in claim 6, said connector means being in an eyelet carried by one of said offset wall portions of said ring.

8. In an improved sinker as defined in claim 2, ballast means carried by said body and secured to project from a lower end thereof.

9. In an improved sinker as defined in claim 8, wherein said closure means includes a closure cap secured on an upper end portion of said body and closing-off the air space therein, and connector means projecting from said closure cap for receiving a fishing line.

10. In an improved sinker as defined in claim 1, each of said offset portions being an inwardly offset continuous portion of said body that is concave transversely of said body.

11. In an improved fishing line sinker as defined in claim 10, said latching finger means comprising a pair of spring-like fingers extending transversely along opposite sides of said slide ring, and each of said fingers having a transversely extending convex contact portion adapted to rest within an associated recess portion and to be moved into and out of latching engagement therewith by rotation of said slide ring with respect to said body.

* * * * *